(Model.)
E. KUHN.
ALARM CLOCK.
No. 259,174. Patented June 6, 1882.
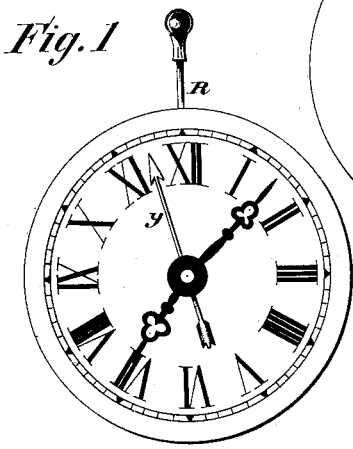
Fig. 1
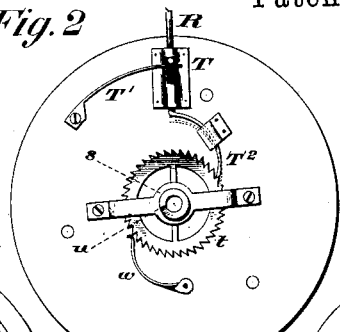
Fig. 2
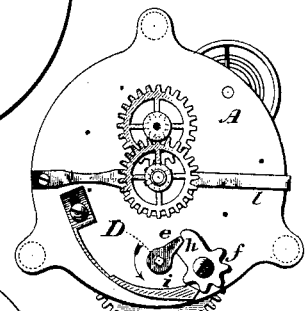
Fig. 3
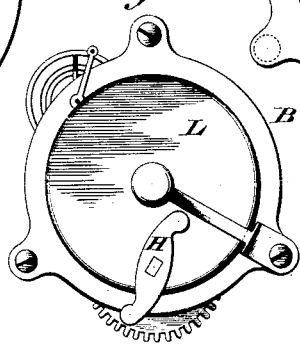
Fig. 4
Fig. 3ª
Fig. 3ᵇ
Fig. 3ᶜ
Fig. 3ᵈ
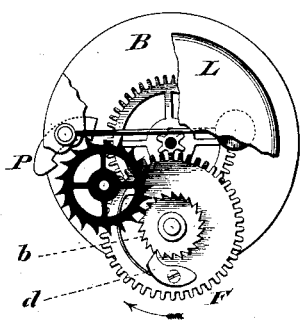
Fig. 5
Fig. 7
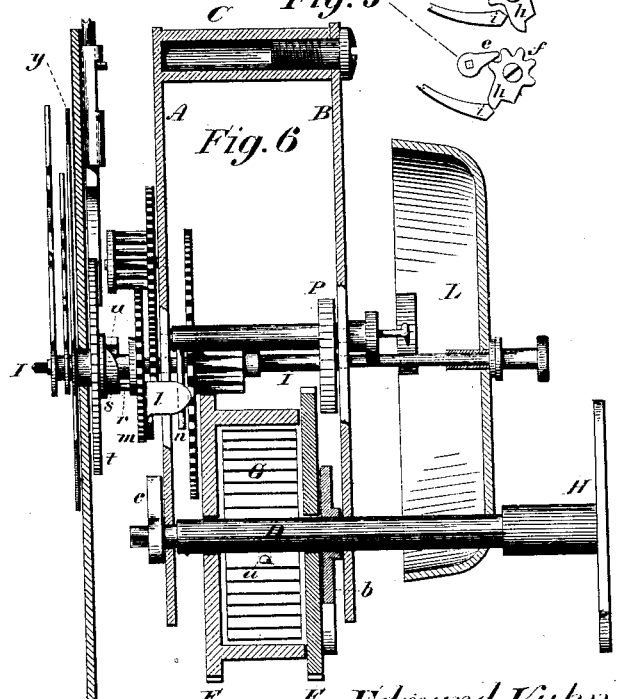
Fig. 6
Witnesses
J. N. Shumway
Jos. C. Earle
Edmund Kuhn,
Inventor,
By Atty.
Wm. C. Earle
N. PETERS, Photo-Lithographer, Washington, D. C.

UNITED STATES PATENT OFFICE.

EDMUND KUHN, OF NEW YORK, N. Y., ASSIGNOR TO THE JEROME CLOCK COMPANY, OF NEW HAVEN, CONNECTICUT.

ALARM-CLOCK.

SPECIFICATION forming part of Letters Patent No. 259,174, dated June 6, 1882.

Application filed January 9, 1882. (Model.)

*To all whom it may concern:*

Be it known that I, EDMUND KUHN, of New York, in the county of New York and State of New York, have invented a new Improvement in Alarm-Clocks; and I do hereby declare the following, when taken in connection with the accompanying drawings and the letters of reference marked thereon, to be a full, clear, and exact description of the same, and which said drawings constitute part of this specification, and represent, in—

Figure 1, a front view of the clock; Fig. 2, a rear view of the dial, showing the mechanism thereto attached, and which is the dial and the movement proper; Fig. 3, a front view, the dial removed; Figs. $3^a$, $3^b$, $3^c$, and $3^d$, detached views; Fig. 4, a rear view; Fig. 5, a rear view, part of the bell and rear plate cut away; Fig. 6, a vertical sectional side view enlarged; Fig. 7, a detached view.

This invention relates to an improvement in that class of clocks which combine with the time-movement an alarm attachment, and in which the alarm is operated by the same spring which operates the time-movement—that is to say, in which the main wheel of the time part and the main wheel of the alarm part are arranged upon the same shaft, with the spring between them, the arrangement being such that the spring will drive each wheel independent of the other. In the usual construction, when the escape is made to permit the alarm to be sounded the main wheel of the alarm revolves, but is arrested at the termination of the first revolution, so that the time during which the alarm would be sounded is limited to that single revolution of the main wheel.

The object of this invention is to permit two or more revolutions of the main wheel of the alarm, whereby the time of sounding the alarm will be proportionately prolonged; and it consists essentially in the arrangement of a finger upon the main shaft, which will engage a toothed wheel and impart to said toothed wheel a movement of one tooth at each revolution of the shaft, the said toothed wheel having an extension or elongated tooth at one point, which will engage said finger, hold and prevent its further rotation at the time when it shall have performed at least two revolutions, and yet permit the rewinding of the spring at all times, whether it be only for the alarm or whether it shall be for the full extent of winding, and also in details of construction, all as more fully hereinafter described.

The movement here shown is that designed for cylindrical or equivalent shaped cases, and is of the "marine" class. The improvement, however, is applicable to movements of other shape and such as employ a pendulum.

A represents the front and B the rear plate of the movement, the two secured together by pillars C in the usual manner.

D is the main shaft, on which the main time driving-wheel E is placed, but loose thereon, so as to permit the wheel to revolve independent of the shaft or the shaft independent of the wheel.

F is the main alarm-wheel, arranged on the same shaft D, also loose thereon, the same as the wheel E. Between the two wheels the usual spring, G, is arranged, one end attached to the shaft D, as at $a$, the other to the time-wheel, in the usual manner. Outside the alarm-wheel, F and fast on the shaft, is a toothed ratchet, $b$, and on the wheel F is a spring-pawl, $d$, which engages the teeth of the ratchet in the usual manner, for holding the mainspring of the clock, so that a key, H, applied to the shaft D to rotate it will wind the spring, the pawl $d$ engaging the ratchet $b$ to hold the spring as it is wound, and when so wound one end acts directly upon the wheel E, in the usual manner for clock-movements, and through the other end, attached to the shaft, its power is applied to turn the wheel F, as indicated in Fig. 5.

The train of gearing from the main time-wheel E is of common construction and arrangement, and needs no further description here than to say that it imparts movement to the center shaft, I, in the usual manner.

With the arrangement of the wheels E and F, and the attachment of the mainspring, as thus far described, the time-movement would continue until the point where the alarm apparatus escapes. Then wheel F would be revolved by the spring and continue its revolution until the spring was exhausted. The result of this would be that the time-movement would stop with the alarm. This was the original construction, where the single spring was employed to operate both the time and alarm. To obviate the running down of the spring, a stop has been arranged to arrest the alarm main wheel after it has performed a single revolution, as I have before mentioned. To permit several revolutions of the wheel, I attach to the shaft D a finger, e, which revolves with the shaft, and preferably outside the front plate, as seen in Fig. 3. Adjacent to this finger e is a toothed wheel, f. At one point in its periphery is a projection, h, with which the finger e will engage, as seen in Fig. 3, and when so engaged the revolution of the shaft D in the direction of unwinding is impossible; but in winding the shaft the finger e passes round in the direction indicated by the arrow, and, striking the projection h, turns it up one point, and, as seen in Fig. 3$^a$, continuing the rotation of the shaft, the next tooth is engaged, as seen in Fig. 3$^b$, the spring-dog i engaging the teeth of the wheel f as it is so turned, thus holding it in the position to which the finger shall turn it until the projection h comes against the spring-dog i, as seen in Fig. 3$^c$. Then the further turning of the wheel f will be prevented; but the spring-dog i, standing, as it does, against the projection h, will yield as the finger strikes the tooth presented on the next revolution of the shaft, and permit it to pass, as seen in Fig. 3$^d$, the reaction of the spring-dog i bringing the wheel back to the position seen in Fig. 3$^e$ so soon as the finger shall have escaped from the wheel, and thus the turning of the shaft will continue until the spring is completely wound, and when so wound the spring acts upon the time part in the usual manner; but when the alarm escapes from the device which holds it until the required time, then the wheel f will be permitted to revolve by the action of the mainspring, and each revolution of that wheel brings the finger into contact with one tooth of the wheel f and turns it to the extent of one tooth, and so continuing, each revolution turning the wheel f one tooth, until finally it brings up against the projection h, as seen in Fig. 3, to arrest the further movement of the alarm part. This will leave the remainder of the spring to continue the time part.

The number of revolutions which the alarm-wheel F will make depends upon the number of teeth in the wheel f, one tooth and one projection giving two revolutions, two teeth and one projection three revolutions, and so on. Therefore, by the use of this movable or rotating stop f, I am enabled to give to the alarm-wheel two or more revolutions, thus prolonging to that extent the time which the alarm will sound. Another advantage of this arrangement is that where a single revolution is given to the wheel, and that revolution arrested by a stop which is tripped to permit the wheel to start when the alarm mechanism escapes, the alarm will be sounded each twelve hours, whereas when in this arrangement the alarm has run down—that is to say, the wheel f has performed its revolution—it cannot operate again until the shaft be turned to rewind the spring to the extent at which it is unwound by the operation upon the alarm in the usual manner. Hence, if the clock be a one-day clock, or more, the alarm will sound but once, unless the spring be rewound.

The mechanism between the main alarm-wheel and the hammer is that of common construction, and as seen in Fig. 5, L representing the bell, the hammer shown in broken lines; P, the verge to which the hammer is attached and through which the vibration is given to the hammer.

The tripping mechanism whereby the alarm is let off at the predetermined time consists of a spring-lever, l. (See Figs. 3 and 7.) This lever is attached on one side of the front plate, and extends across to the opposite side, where it turns backward, so as to engage an arm, n, on the alarm verge shaft, and when pressed backward, as seen in Fig. 5, it holds the verge in contact with the escapement-wheel, so as to prevent the revolution of that wheel; but at the proper time the lever l is permitted to spring forward, (seen in broken lines, Fig. 7,) which releases the verge and permits the revolution of the wheels and the vibration of the hammer. This lever lies in rear of the hour-hand wheel m, that wheel being loose upon its shaft, so as to be easily thrown outward by the spring on the lever, as indicated in broken lines, Fig. 7. On the hub of this wheel is a stud, r, projecting forward against a cam, s, on a wheel, t, which sets over the hollow shaft of the hour-wheel m, and as seen in Fig. 6, also seen in Fig. 2. This cam s has a fall-off or escape, u, at one point, so that when the pin r arrives at that fall-off it escapes and permits the lever l to spring outward, as before described. The cam is set so that this fall-off or shoulder u will stand at a point so that the pin r will escape therefrom at the time when it is desired the alarm shall be sounded. To adjust the cam to different times it is attached or made a part of a wheel, t, arranged on the dial-plate, as seen in Figs. 2 and 6, but so as to revolve freely upon or concentric with the hour-wheel. This wheel is toothed, preferably in the form of ratchet-teeth, and provided with a spring, w, to operate upon the wheel to prevent its accidental or backward movement.

On the back of the dial is a vertical rod, R, arranged in a guide, T, so as to be freely movable up and down thereon, and is provided with a spring, T', the tendency of which is to throw the rod upward. This rod is provided at its upper end with any suitable knob or handle, by which it may be conveniently depressed. From the lower end of the rod a finger, T$^2$, extends down, so as to engage the tooth on the wheel b. Hence by depressing the rod, as seen in broken lines, Fig. 2, the wheel $t$ will be turned, and with it the cam $s$. To indicate the position of the cam, a pointer, $y$, is attached to the cam outside the dial, the shoulder being in such relation to the pointer and to the pin $r$ on the hour-wheel that the pointer will indicate the time on the dial when the pin $r$ will escape from the shoulder on the cam—that is to say, the pointer will indicate the time when the alarm will be sounded.

While I prefer the toothed wheel $f$ and its projection $h$ to engage the shaft, so as to permit two or more revolutions before its arrest will take place, other mechanism may be employed to thus permit the two or more revolutions of the shaft and arrest its revolution after the said two or more revolutions are completed. I therefore do not wish to be understood as limiting my invention to the wheel $f$, as shown.

I claim—

1. In a combined time and alarm clock movement, the combination of the time main wheel and the alarm main wheel, both loose upon the main shaft, the mainspring, one end of which engages the time-wheel and the other the main shaft, a pawl and ratchet between said shaft and alarm main wheel, a stop, and mechanism, substantially such as described, between said stop and main shaft to cause said shaft to turn the said stop one point at each of the first two or more revolutions in winding, and a device to hold said stop during the completion of the winding, substantially as described.

2. In a combined time and alarm clock movement, the combination of the time main wheel and the alarm main wheel, both loose upon the main shaft, the mainspring, one end of which engages the time-wheel and the other the shaft, a pawl and ratchet between said shaft and main alarm-wheel, which permits the revolution of the shaft in one direction independent of the alarm-wheel, a finger attached to said main shaft and revolving with it, the toothed wheel $f$, constructed with a projection, $h$, and the spring-dog $i$, substantially as described.

3. The combination of the toothed wheel $t$, arranged concentric with the hour-wheel and carrying the pointer, and also carrying the cam $s$, with the sliding rod R, provided with a finger, $T^2$, to engage the teeth of the wheel $t$, and mechanism, substantially such as described, between the said cam $s$ and the alarm mechanism, substantially as and for the purpose described.

ED. KUHN.

Witnesses:
AUGUSTUS JENNINGS,
JOHN W. BURR.